United States Patent [19]

Roshen et al.

[11] Patent Number: 4,837,659
[45] Date of Patent: Jun. 6, 1989

[54] TRANSFORMER/INDUCTOR WITH INTEGRATED CAPACITOR USING SOFT FERRITES

[75] Inventors: Waseem A. Roshen; David E. Turcotte; Dale F. Regelman, all of Tucson, Ariz.

[73] Assignee: ITT Corporation, New York, N.Y.

[21] Appl. No.: 171,313

[22] Filed: Mar. 21, 1988

[51] Int. Cl.4 .......................... H01H 9/28; H01F 27/28
[52] U.S. Cl. ....................................... 361/270; 336/232
[58] Field of Search .................. 361/268, 270; 336/69, 336/232

[56] References Cited

U.S. PATENT DOCUMENTS

| | | | |
|---|---|---|---|
| 2,521,513 | 9/1950 | Gray | 361/270 X |
| 2,524,754 | 10/1950 | Björklund | 361/268 |
| 3,566,202 | 2/1971 | Carr | 317/157 |
| 4,211,957 | 7/1980 | Alley | 315/276 |
| 4,322,698 | 3/1982 | Takahashi et al. | 336/232 X |
| 4,543,553 | 9/1985 | Mandai et al. | 336/232 X |

*Primary Examiner*—Donald A. Griffin
*Attorney, Agent, or Firm*—Thomas L. Peterson

[57] ABSTRACT

A discrete electromagnetic device in which the transformer/inductor function and a capacitive function are integrated is achieved by utilizing both the magnetic permeability and the dielectric constant of one or more soft ferrite layers. The device is comprised of a plurality of soft ferrite planar layers spaced apart in a stacked array. Between each soft ferrite layer is a metallic layer which forms one of the plates of the capacitor. A first and second set of apertures are defined through each of the planar ferrite layers. The first and second set of apertures are aligned among the plurality of ferrite layers so that a conductive element is led through one set of apertures to form a loop or coil. A similar conductive element or coil is led through the second set of apertures to form a second loop. The two loops thus serve as the secondary and primary of a transformer or alternatively as two inductors with the ferrite material acting as the magnetically permeable core. Additionally, the metallic plates are electrically coupled together to form a capacitor in which the intervening ferrite cores act as a separating dielectric material.

13 Claims, 1 Drawing Sheet

TRANSFORMER/INDUCTOR WITH INTEGRATED CAPACITOR USING SOFT FERRITES

BACKGROUND OF THE INVENTION

1. Field of the Invention

The invention relates to the field of electrical devices and in particular to a discrete device in which the design and structure of a transformer/inductor and capacitor are integrated.

2. Description of the Prior Art

A continuing and permanent trend in the electronics industry is to increase the packaging density in order to reduce the size of products. This has been realized not only through the use of integrated circuits wherever possible or a custom large scale integration of semiconductor circuits, but also in the miniaturization of discrete electrical devices which do not lend themselves to semiconductor integrated technology.

Miniaturization of device size typically results not only in a higher utility of the resulting product, but often in a reduced cost of materials and manufacturing.

The kinds of discrete electronic products which have been integrated with only partial success specifically include transformers or inductors and capacitors. For example, integration of a capacitor with an inductor has been achieved in integrated devices using amorphous metal ribbons.

ALLEY et al., "Amorphous Metal Lamp Ballast Having a Capacitor Integral with the Magnetic Core", U.S. Pat. No. 4,211,957 (1980), shows a magnetic core of lamp ballast which is bifilar wound from a thin amorphous metal strip and wherein the laminations of the magnetic circuit are also used as the plates of a capacitor.

CARR, "Self Resonant Ignition Coil and System", U.S. Pat. No. 3,566,202 (1971), shows an inductive ignition coil which includes a built-in capacitance used to resonate the secondary of the coil.

BJOERKLUND, "Unitary Magnetic Core and Condenser", U.S. Pat. No. 2,524,754 (1950), also describes a ballast for an electric discharge lamp in which a capacitive unit is built up of coils of magnetic material electrically insulated from each other and forming the electrodes of a condenser while the inductive unit is wound upon the condenser.

Thus, it was well understood in the prior art to devise various types of integrated units which act both as an inductor and capacitor by appropriate exploitation of a metallic would surface of coil to act both as part of the inductor coils and the conducting plates of the capacitor. Typically, amorphous metal was used as the material for the structure performing this dual function. However, in such prior art units the inductive and capacitive values obtained in such integrated structures are limited in range.

Therefore, what is needed is some type of design for an integrated transformer/inductor and capacitance device wherein the inductive and capactive range of the device may be substantially increased without sacrificing any of the miniaturization achieved by virtue of the integration.

BRIEF SUMMARY OF THE INVENTION

The invention is an integrated inductive and capacitive device comprising at least one soft ferrite layer, and at least a first conductive element forming a loop. The loop encloses at least part of the soft ferrite layer within the loop formed by the first conductive element. At least a pair of second conductive elements are also included. The pair of second conductive elements are disposed on opposing sides of the soft ferrite layer. The pair of second conductive elements form a capacitor with at least a portion of the soft ferrite layer disposed between the pair of second conductive elements.

As a result, an integrated inductive and capacitive device is fabricated and is characterized by enhanced inductive and capacitive magnitudes.

In the illustrated embodiment the soft ferrite layer and pair of second conductive elements are each planar. The first conductive element forms the corresponding loop in a plane generally perpendicular to the planar soft ferrite layer.

The integrated inductive and capacitive device further comprises a third conductive element forming a loop with at least a portion of the soft ferrite layer disposed within the loop formed by the third conductive element. The first and third conductive elements form a transformer with the soft ferrite layer acting as a magnetic core therebetween.

In the illustrated embodiment a plurality of soft ferrite planar layers are provided. The plurality of soft ferrite planar layers is stacked in a spaced-apart array and having defined therethrough two sets of apertures. Each set of apertures is mutually aligned to permit the first conductive element to be disposed through the appropriately corresponding set of apertures to form the loop. The integrated inductive and capacitive device further comprises a third conductive element forming a loop with at least a portion of the soft ferrite layer disposed within the loop formed by the third conductive element. The first and third conductive elements form a transformer with the soft ferrite layer acting as a magnetic core therebetween. The plurality of soft ferrite layers have defined therethrough a second set of apertures. The third conductive element is disposed through the second set of apertures to form the corresponding loop of the third conductive element. The second conductive element comprises a plurality of the second conductive elements. Each one of the plurality of second conductive elements is spaced apart and separated by one of the plurality of soft ferrite planar layers. The plurality of second conductive planar layers is associated through electrical coupling to form a capacitor.

In one embodiment the first conductive element is metallic wire. In another embodiment the first conductive element is a metallic foil strip. In the illustrated embodiment the soft ferrite layer is composed of manganese zinc. The soft ferrite layer is characterized by magnetic permeability in excess of $10^3$ and a relative dielectric constant in excess of $10^4$.

The invention is also characterized as an integrated and inductive capacitive device comprising a plurality of soft planar ferrite layers arranged and configured in a spaced-apart stack. Each ferrite layer has a first and second set of apertures defined therethrough. The first set of apertures through each of the plurality of ferrite layers is aligned with the corresponding set of apertures through each other one of the plurality of ferrite layers. The second set of apertures defined in each ferrite layer is aligned when arranged in the stacked array with each other one of the second set of apertures defined through the remaining ones of the plurality of ferrite layers. A plurality of planar conductive sheets is disposed in the stacked array of ferrite layers. One conductive sheet is disposed between each adjacent pair of ferrite layers in the array. The conductive sheets are electrically coupled together to form a capacitor. A first inductive coil is disposed through the first set of apertures defined through the ferrite layers. A second inductive coil is disposed through the second set of apertures defined through the ferrite layers. The first and second inductive coils form a transformer.

As a result, the magnetic permeable properties of the soft ferrite layer are utilized in the transformer and the dielectric properties of the soft ferrite layer are utilized in the capacitor.

The invention and its various embodiments may now be understood by turning to the following detailed description.

DETAILED DESCRIPTION OF THE PREFERRED EMBODIMENTS

A discrete electromagnetic device in which the transformer/inductor function and a capacitive function are integrated is achieved by the utilization of both the magnetic permeability and the dielectric constant of one or more soft ferrite layers disposed within the device. The device is comprised of a plurality of soft ferrite planar layers spaced apart in a stacked array. Between each soft ferrite layer is a metallic layer which forms one of the plates of the capacitor. A first and second set of apertures are defined through each of the planar ferrite layers. The first and second set of apertures are aligned among the plurality of ferrite layers so that a conductive element or coil is led through one set of apertures to form a loop which encloses both the capacitor plates and a portion of the ferrite layers. A similar conductive element or coil is led through the second set of apertures to form a second loop. The two coils thus serve as the secondary the primary of a transformer or alternatively as two inductors with the ferrite material acting as the magnetically permeable core. Additionally, the metallic plates are electrically coupled together to form a capacitor in which the intervening ferrite cores act as a separating dielectric material. Soft ferrite material has a magnetic permeability and a relative dielectric constant of sufficient magnitude to be satisfactorily and simultaneously act both as a magnetic transformer core and as a dielectric insulator in a capacitor.

The present invention uses soft ferrites to perform the dual function of the magnetic coil for the transformer/inductor as well as the interlying dielectric for the capacitor. The functions performed by the capacitor plates and the induction coils are each performed by separate elements.

Figure 1:
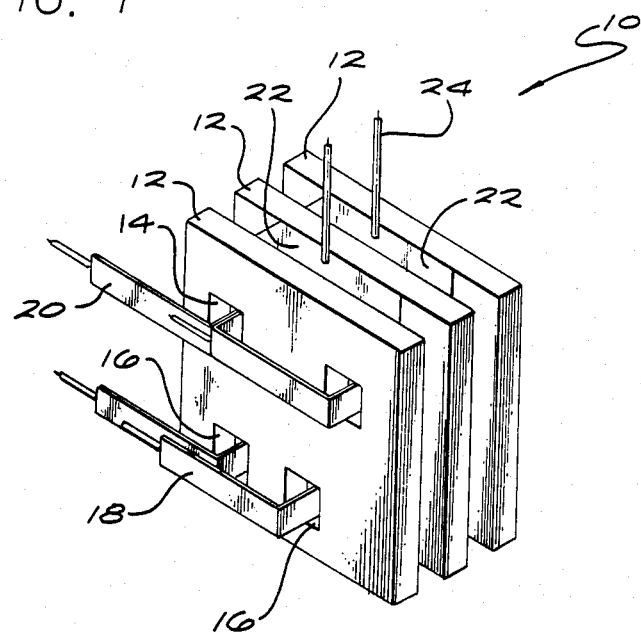
FIG. 1 is a diagrammatic depiction of an integrated transformer/inductor and capacitor built according to the invention.
Figures 2, 3:
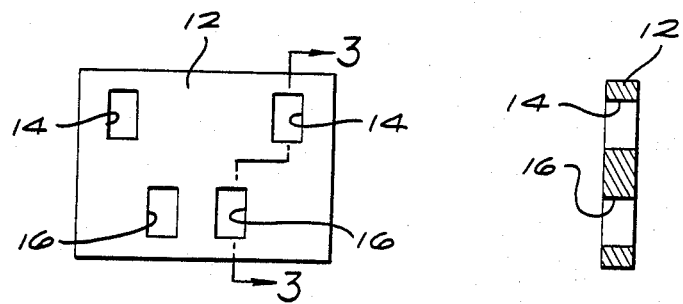
FIG. 2 is a top plan view of one of the capacitor plates illustrated in the perspective view of FIG. 1.
FIG. 3 is a side sectional view of the capacitor plate shown in FIG. 2.

A highly diagrammatic depiction of the invention is illustrated in the perspective view of FIG. 1. The device, generally denoted by reference numeral 10, is a planar structure which is typically comprised of a multiplicity of ferrite slabs 12 stacked one behind the other. Consider for the moment only the transformer/inductor function. Each ferrite slab, which is shown in the plan view of FIG. 2, includes a plurality of apertures 14 and 16 defined therethrough. In the diagrammatic depiction of FIG. 2, a first set of apertures 14 are shown in the upper portion of slab 12 while a second set of apertures 16 are shown in the lower portion. As also depicted in the side cross-sectional view of Figure 3, taken through lines 3—3 in FIG. 2, sets of apertures 14 and 16 are illustrated as simple holes which extend through the entire thickness of ferrite slab 12.

Returning to FIG. 1, electrical conductors 18 and 20, either in the form of sheet strips or wire, are passed through each set of apertures 14 and 16 defined through the plurality of ferrite slabs 12 to make at least one complete turn and therefore form the primary and secondary coil of the transformer/inductor. The output-/input voltage ratio of the transformer function of device 10 is determined according to ordinary design principles by the turn's ratio as well as the ratio of the area of the cross section of the secondary and primary coils.

For example, in the diagrammatic depiction of FIG. 1 lead 20 is shown as a single turn of a foil strip 20 disposed through apertures 14 in each of the three ferrite slabs 12 which comprise device 10 illustrated in FIG. 1, while a similar metallic foil strip 18 is disposed through apertures 16 to form the secondary coil. It is expressly to be understood that multiple turns of foil strips 18 and 20 could be utilized in a practical device and that the turns would be insulated from one another by an appropriate insulative coating one the foil strips. The spacing of apertures 16 and 14 thus determines one dimension of the area of the primary and secondary coils formed by the turn of turns of foil strips 18 and 20. Therefore, the ultimate value of the inductance of device 10 will depend according to well understood principles on the number of turns of strips 18 and 20, the relative area of the cross sections of the coils formed by strips 18 and 20 and the magnetic permeability of the ferrite material which comprises ferrite slabs 12.

Consider now the capacitive function of device 10 as diagrammatically depicted in FIG. 1. The planar structure of device 10 also allows an integrated capacitor to be fabricated. By placing conductive sheets of plates 22 between each of the ferrite slabs 12 in an analogous stacked array, and by appropriately coupling plates 22 together to form at least two sets of spaced-apart plates, a capacitor can be devised which will perform according to ordinary design principles.

In the simplified diagrammatic depiction of FIG. 1, just two plates 22 are disposed with a single ferrite slab 12 interposed between them. Conventional electrical leads 24 can then be connected to plates 22 to form the capacitor leads. The position and spacing of apertures 14 and 16 are chosen to allow insertion of plates 22 between slabs 12. In the diagrammatic depiction, upper apertures 14 are spaced further apart than the corresponding width of plates 22 while lower apertures 16 are closer together since plates 22 do not extend downwardly between slabs 12 of interfere with the foil strips led through apertures 16. Many other arrangements of apertures spacing and plate positioning could also be utilized. For example, if desired apertures 14 and 16 could also be defined through plates 22 which would then extend out of the loops defined by foil strips 18 and 20 which would be insulated from plates 22.

The ferrite material, whose magnetic permeability is used as the inductor core for the transformer function, is also utilized as the dielectric material in the capacitor. Thus, according to well established design principles, the value of the capacitance device 10 depends upon the dielectric constant of the ferrite, the area covered by metallic plate 22, the thickness of interlying ferrite slab 12 and the number of such capacitive plates which may be appropriately coupled.

What is surprising in the present instance is that ferrite material, which serves the dual function in an integrated capacitor and transformer, has a high magnetic permeability (and is normally chosen in various types of magnetic circuits on account of its magnetic permeability) is also characterized by a relatively high dielectric constant. It is surprising that most soft ferrite materials which are typically used as core materials in magnetic devices, also have very large dielectric constants, see for example E. P. Snelling, "Soft Ferrites", I.I.L.F.F.E., London 1969.

For example, in the illustrated embodiment, manganese zinc ferrite is employed which has a relative dielectric constant of the order of $10^4$–$10^5$. In a device fabricated according to the teachings of FIG. 1, where five ferrite plates each of 50 mils thickness and having an area of one square inch, inductance values in the range of microHenries is realized with capacitances in the range of tens of nanoFarads.

These values for inductance and capacitance could easily be increased by increasing the number of turns of the coils, cross-sectional areas, the thinness of the ferrite slabs 12 and the number of slabs and capacitive plates. Alternatively or in addition thereto, the choice of a soft ferrite material with even higher dielectric constants and magnetic permeabilities could also be employed. For example, without limitation the following soft ferrites listed in Table 1 could be easily substituted as appropriate for the manganese-zinc ferrite discussed above. Although not presently preferred, selected members of the family of nickel-zinc ferrites could also be utilized.

TABLE 1*

| Ferrite | Magnetic Permeability | Relative Dielectric Constant |
| --- | --- | --- |
| 3B5 | $>1.5 \times 10^3$ | $>9 \times 10^4$ |
| A7 | approx. $7 \times 10^3$ | $>2 \times 10^5$ |
| 3H1 | $>2 \times 10^3$ | $>10^5$ |

*3B5 and 3H1 are type designations for manganese zinc ferrites sold by Ferroxcube of Faugertias, New York and by N.V. Phillips of the Netherlands.
A7 is a type designation for a manganese zinc ferrite sold by Ferroxcube of Faugertias, New York and by Mullard Ltd. of the Netherlands.

Many modifications and alterations may be made by those having ordinary skill in the art without departing from the spirit and scope of the invention. Therefore the illustrated embodiments should be read only by way of example and should not be viewed as limiting invention as defined in the following claims.

We claim:

1. An integrated inductive and capacitive device comprising:
   at least one planar, soft ferrite layer;
   at least a first conductive element forming a loop in a plane generally perpendicular to said planar soft ferrite layer, said loop enclosing at least part of said soft ferrite layer within said loop formed by said first conductive element; and
   at least a pair of second conductive elements, said pair of second conductive elements being planar, rectangular sheet-like plates disposed on opposing sides of said soft ferrite layer, said pair of second conductive elements forming a capacitor with said at least a portion of said soft ferrite layer disposed between said pair of second conductive elements,
   whereby an integrated inductive and capacitive device is fabricated and is characterized by enhanced inductive and capacitive magnitudes.

2. The integrated inductive and capacitive device of claim 1 further comprising a third conductive element forking a loop substantially parallel to said loop formed by said first conductive element, with at least a portion of said soft ferrite layer disposed within said loop formed by said third conductive element, said first and third conductive elements forming a transformer with said soft ferrite layer acting as a magnetic core therebetween.

3. An integrated inductive and capacitive device comprising:
   at least one soft ferrite layer;
   at least a first conductive element forming a loop, said loop enclosing at least part of said soft ferrite layer within said loop formed by said first conductive element; and
   at least a pair of second conducting elements, said pair of second conductive elements disposed on opposing sides of said soft ferrite layer, said pair of second conductive elements forming a capacitor with said at least a portion of said soft ferrite layer disposed between said pair of second conductive elements,
   wherein a plurality of soft ferrite planar layers are provided, said plurality of soft ferrite planar layers being stacked in a spaced apart array and having defined therethrough two sets of apertures, each set of apertures being mutually aligned to permit said first conductive element to be disposed through said set of apertures to form said loop,
   whereby an integrated inductive and capacitive device is fabricated and is characterized by enhanced inductive and capacitive magnitudes.

4. The integrated inductive and capacitive device of claim 3 further comprising a third conductive element forming a loop with at least a portion of said soft ferrite layer disposed within said loop formed by said third conductive element, said first and third conductive elements forming a transformer with said soft ferrite layer acting as a magnetic core therebetween, said plurality of soft ferrite layers having defined therethrough a second set of apertures, said third conductive element disposed through said second set of apertures to form said corresponding loop of said third conductive element.

5. The integrated inductive and capacitive device of claim 3 wherein said second conductive element comprises a plurality of said second conductive elements, each one of said plurality of second conductive elements being spaced apart and separated by on of said plurality of soft ferrite planar layers, said plurality of second conductive planar layers being associated through electrical coupling to form a capacitor.

6. The integrated inductive and capacitive device of claim 1 wherein said soft ferrite layer is composed of manganese zinc.

7. The integrated inductive and capacitive device of claim 1 wherein said soft ferrite layer is characterized by magnetic permeability in excess of $10^3$ and a relative dielectric constant in excess of $10^4$.

8. An integrated and inductive capacitive device comprising:

a plurality of soft planar ferrite layers arranged and configured in a spacedapart stack, each ferrite layer having a first and second set of apertures defined therethrough, said first set of apertures through each of said plurality of ferrite layers being aligned with said corresponding set of apertures through each other one of said plurality of ferrite layers and said second set of apertures defined in each ferrite layer being aligned when arranged in said stacked array with each other one of said second set of apertures defined through said remaining ones of said plurality of ferrite layers;

a plurality of planar conductive sheets disposed in said stacked array of ferrite layers, one said conductive sheet being disposed between each adjacent pair of ferrite layers in said array, said conductive sheets electrically coupled together to form a capacitor;

a first inductive coil disposed through said first set of apertures defined through said ferrite layers;

a second inductive coil disposed through said second set of apertures defined through said ferrite layers, said first and second inductive coils forming a transformer, whereby the magnetic permeable properties of said soft ferrite layer are utilized in said transformer and the dielectric properties of said soft ferrite layer are utilized in said capacitor.

9. The integrated inductive and capacitive device of claim 8 wherein said soft ferrite layer is composed of manganese zinc.

10. The integrated inductive and capacitive device of claim 8 wherein said first inductive coil is a coil of insulated metallic wire.

11. The integrated inductive and capacitive device of claim 8 wherein said first and second inductive coil is formed from an insulated metallic foil strip.

12. The integrated inductive and capacitive device of claim 8 wherein said first and second set of apertures are defined only through said soft ferrite layer and not through said plurality of planar conductive sheets.

13. The integrated inductive and capacitive device of claim 8 wherein said first and second set of apertures are correspondingly defined to said planar conductive sheets as well as said soft planar ferrite layers.

* * * * *